United States Patent
McCormack et al.

(10) Patent No.: US 8,929,533 B2
(45) Date of Patent: Jan. 6, 2015

(54) PEER TO PEER CONTACT CENTER

(75) Inventors: Tony McCormack, Galway (IE); Neil O'Connor, Lackagh (IE); Arik Elberse, Knocknacarra (IE); Patrick Hession, Oranmore (IE)

(73) Assignee: Rockstar Consortium US LP, Plano, TX (US)

( * ) Notice: Subject to any disclaimer, the term of this patent is extended or adjusted under 35 U.S.C. 154(b) by 1070 days.

(21) Appl. No.: 11/563,284

(22) Filed: Nov. 27, 2006

(65) Prior Publication Data
US 2008/0123839 A1    May 29, 2008

(51) Int. Cl.
*H04M 3/00* (2006.01)
*H04M 3/523* (2006.01)
*H04M 7/00* (2006.01)

(52) U.S. Cl.
CPC ............ *H04M 3/523* (2013.01); *H04M 3/5237* (2013.01); *H04M 7/0063* (2013.01)
USPC ............ 379/265.02; 379/265.01; 379/265.05; 379/265.07; 379/265.1; 379/265.11; 370/352

(58) Field of Classification Search
USPC ................. 379/265.02, 265.09, 65.1, 211.02, 379/266.07, 2; 370/449, 352
See application file for complete search history.

(56) References Cited

U.S. PATENT DOCUMENTS

| | | | | |
|---|---|---|---|---|
| 5,991,392 | A * | 11/1999 | Miloslavsky | 379/211.02 |
| 6,826,194 | B1 * | 11/2004 | Vered et al. | 370/449 |
| 7,929,562 | B2 * | 4/2011 | Petrovykh | 370/429 |
| 7,965,829 | B2 * | 6/2011 | Crockett et al. | 379/211.02 |
| 2004/0213209 | A1 * | 10/2004 | O'Connor et al. | 370/352 |
| 2005/0141694 | A1 * | 6/2005 | Wengrovitz | 379/265.09 |
| 2006/0023859 | A1 * | 2/2006 | Crockett et al. | 379/212.01 |
| 2006/0023868 | A1 * | 2/2006 | Dezonno et al. | 379/265.09 |
| 2006/0045256 | A1 * | 3/2006 | Erdman | 379/266.07 |
| 2006/0133349 | A1 * | 6/2006 | Kan et al. | 370/352 |
| 2007/0047716 | A1 * | 3/2007 | Crockett et al. | 379/211.02 |
| 2007/0064913 | A1 * | 3/2007 | Shaffer et al. | 379/265.02 |
| 2007/0071223 | A1 * | 3/2007 | Lee et al. | 379/265.02 |
| 2007/0201674 | A1 * | 8/2007 | Annadata et al. | 379/265.01 |
| 2007/0263838 | A1 * | 11/2007 | Wiseman et al. | 379/265.02 |
| 2008/0008305 | A1 * | 1/2008 | Neuhaus | 379/211.02 |

OTHER PUBLICATIONS

Rosenberg et al, RFC 3261—SIP Protocol, Jun. 2002, pp. 1-343.*

* cited by examiner

*Primary Examiner* — Joseph J Nguyen
(74) *Attorney, Agent, or Firm* — Barnes & Thornburg LLP

(57) ABSTRACT

A peer to peer contact center is provided by individual user terminals registering with a server which acts as a proxy to receive contacts from callers to the contact center. The server redirects the calls to individual terminals according to simple rules without subjecting the calls to any contact center treatment. The individual terminal receiving a call subjects the call to a contact center treatment while holding the call, and then determines from among the registered terminals the most suitable terminal for handling the call. The call is then transferred to the selected terminal. In this way the complex infrastructure of traditional contact centers is dispensed with and each individual terminal acts as a mini contact centre in respect of the calls distributed to it in a dumb or semi-dumb fashion by the server.

19 Claims, 3 Drawing Sheets

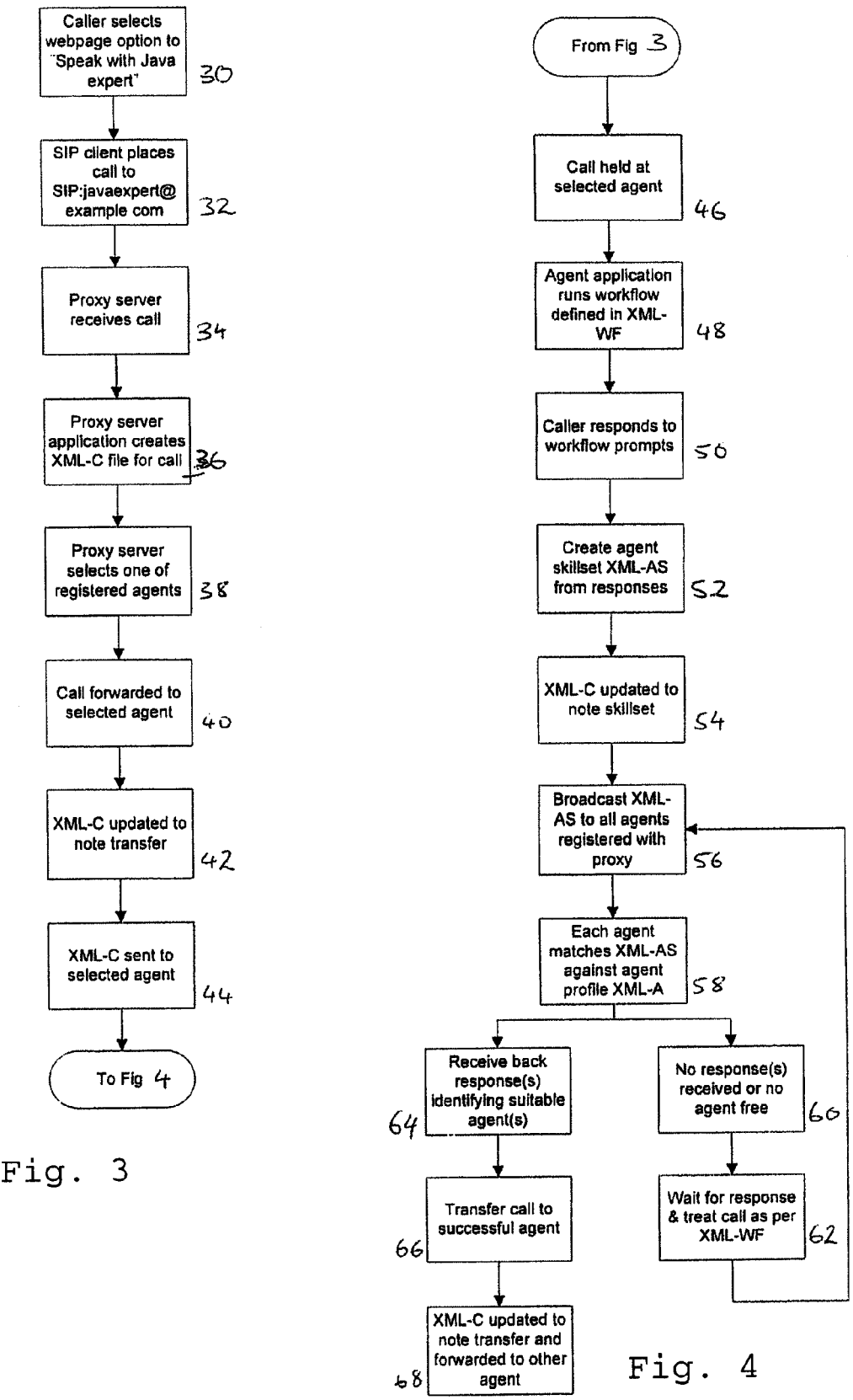

PEER TO PEER CONTACT CENTER

TECHNICAL FIELD

This invention relates to the provision of contact center services.

BACKGROUND ART

Traditional contact centers comprise servers for handling communication types such as telephony and video calls, email, instant messages, and so forth. These communication sessions between agents of the contact center and external parties (customers or callers) can be inbound or outbound. The agents are individuals who are employed or contracted by the contact center to handle these communications in accordance with the business objectives of the contact center management.

The agents are typically connected via workstations over a local area network or wide area network having an interface with public networks (e.g. the Internet or the public switched telephone network or PSTN), and communications sessions with the public networks are usually handled by communications servers or switches. Agent software on the agent workstations interacts with the communications servers to ensure the efficient handling of communications in accordance with workflow procedures executing on the servers or on other computing systems of the contact center. In addition to these basic components, the contact center may also run a web server with which customers may interact and typically will also have one or more media servers for providing services such as music-on-hold and interactive voice response (IVR) technology.

Such contact centers have developed to meet the needs of businesses which wish to provide a channel for interacting with customers or potential customers. For this reason a conventional contact center enlists trained employees to act as its agents, and customers of the company can employ the contact center to speak to an agent and thereby obtain information or assistance in relation to the products of the company.

It is frequently the case that individuals will have a need to seek assistance in relation to products or services which may not be provided by a particular company, or individuals may wish to bypass the mechanisms provided by a company and instead interact directly with other users of the company's products. Individuals often wish to discuss topics of interest which are unrelated to any company or organisation. The expense of current contact center technology makes it most unlikely that any mechanism as efficient as a contact center will exist for such groups of users.

Current technology provides, however, a number of other mechanisms allowing individuals to contact and interact with others having similar interests. The forerunner of many such systems was the networked group of servers known as Usenet, which provided an Internet-based newsgroup system before the advent of the World Wide Web. Usenet is still accessible directly using programs known as newsreaders, or via web interfaces such as Google Groups (formerly deja.com).

Under Usenet, individual message boards are arranged in hierarchies organised under top level areas such as "sci" (for science-related topics) or "rec" (for recreational topics). Thus, for example, topics of interest to physicists would be discussed in the group "sci.physics", whereas automobile enthusiasts would discuss issues by posting messages to "rec.autos". News groups can be created in Usenet with any desired degree of granularity for discussing more and more specific interests, such as "sci.physics.relativity", or "rec.autos.sport.rally".

Usenet news groups, and many other parallel technologies providing discussion groups or bulletin boards, basically work by allowing users to post text-based messages, sometimes with attachments, into the group. Other users can read and reply to this message. In this way, interested users can assist one another, ask questions, and discuss or argue over topics of mutual interest. Discussions on different subjects are distinguished by the message header which allows messages to be threaded with one another.

The primary advantage of systems such as Usenet is in providing a mechanism for allowing unrelated users to communicate and share knowledge without relying on (or being moderated by) particular companies. However, it will be appreciated that the degree of interaction provided by message board systems is quite inferior to that provided by a contact center. Message board communications are asynchronous, i.e. one must wait for a response without knowing when such a response might be posted and without being able to speak directly to other users to more efficiently direct the discussion.

DISCLOSURE OF THE INVENTION

The invention provides a method of operating a contact center comprising the steps of:
  registering a plurality of agent terminals with a server;
  said server directing a communications session to a first one of said agent terminals;
  said first agent terminal holding said communications session and subjecting said session to automated treatment;
  said first agent terminal determining the identity of a second one of said agent terminals for live participation in said communications session; and
  said first agent terminal directing said communications session to said second agent terminal.

In contrast to conventional contact centers the initial treatment of a communications session and the distribution of the call to the agent which will handle the communications session, occurs at the level of the agent terminals themselves.

A server is involved only in handing on the communications session to a first terminal, with the contact center functionality occurring at the terminals which are equipped to provide media treatment and call distribution capabilities.

A peer to peer contact center is thus provided by individual user terminals registering with a server which acts as a proxy to receive contacts from callers to the contact center. The server redirects the calls to individual terminals according to simple rules (i.e. in a dumb or semi-dumb fashion) without subjecting the calls to any contact center treatment (note also that optionally the server can employ sophisticated routing algorithms to determine the most suitable initial terminal to anchor the session). The individual terminal receiving a call subjects the call to a contact center treatment while holding the call, and then determines from among the registered terminals the most suitable terminal for handling the call. The call is then transferred to the selected terminal. In this way the complex infrastructure of traditional contact centers is dispensed with and each individual terminals acts as a mini contact centre in respect of the calls distributed to it by the server.

Preferably, therefore, said server directs the session immediately to said first agent terminal without subjecting said session to media treatment or skillset analysis.

In this way, the server can approach a dumb server, being provided only with simple rules for call distribution (e.g. direct call to least busy agent terminal, most recently registered agent terminal, to random terminal, to each terminal in order, etc.), and serving simply as a distribution gateway or proxy towards which callers direct calls.

As used herein the term "call" is a shorthand for a live communications session, normally including voice or video, but also including and not limited to other communication channels, such as chat, Instant Messaging, Email. The term "communications session" as used herein encompasses also the request to initiate a session, when the session is initiated in a protocol providing call set up by means of message exchange, such as in the session initiation protocol (SIP).

Preferably, said communications session is created using the session initiation protocol (SIP) and the server directs said communications session to the first agent terminal by receiving and forwarding a SIP request message to said first agent terminal, and said first agent terminal completes the set up of a call in response to said request message.

Further, preferably, said server is a proxy server registered to a SIP address which provides a portal to the peer to peer contact center.

Preferably the method also comprises the steps of the first agent terminal forwarding to the second agent terminal a record associated with the communications session recording the arrival and treatment of the session, and said second terminal updating said record with further details of the communications session at said second agent terminal.

In this way, a record can accompany the call to record significant events in the life of the call, and such log files can be subsequently analysed, amalgamated or summarised to generate statistics on a contact center level.

Preferably said first agent terminal subjecting said session to automated treatment results in said first agent terminal determining a skillset requirement of the communications session.

Further, preferably, the step of determining the identity of said second agent terminal for live participation in said session comprises comparing said communications session skillset information with information held at each of said terminals regarding the users of those terminals.

In one embodiment said comparison between said communications session skillset information and user information is conducted by each of said terminals on receipt of said skillset information.

In another embodiment said comparison between said communications session skillset information and user information is conducted by said first terminal on receipt of said user information from the respective terminals.

Thus, the first terminal can solicit a response from the other terminals based on a set of requirements for an agent and the other terminals can inform the first terminal of their suitability to handle the session, or the first terminal can request the other terminals to relate back information regarding the users of those terminals (i.e. the human agents) and the first terminal judges which terminal is most suitable to receive the call.

The user information can include information about the skills and preferences of the users.

The user information can alternatively or additionally include information indicative of the state of availability of the user to participate in the communications session.

Preferably the skillset information and/or the user information are communicated in SIP messages exchanged between the terminals.

More preferably said messages are created and maintained by the respective terminals in the extensible mark-up language (XML).

In another aspect the invention provides a computer program product which when executed in a computer system for use as an agent terminal of a contact center is effective to cause said computer system, after registering as an agent terminal with a server and receiving from said server a communications session to a first one of said agent terminals, to:
  hold said communications session and subject said session to automated treatment;
  determine the identity of another agent terminal, similarly registered with said server as an agent terminal, for live participation in said communications session; and
  direct said communications session to said other agent terminal.

The invention further provides a contact center system comprising:
  a server;
  a plurality of agent terminals registered with said server;
  said server comprising a direction program for directing a communications session to a first one of said agent terminals;
  said first agent terminal being programmed to hold said communications session and subject said session to automated treatment;
  said first agent terminal being further programmed to determining the identity of a second one of said agent terminals for live participation in said communications session; and
  said first agent terminal being further programmed to direct said communications session to said second agent terminal.

BRIEF DESCRIPTION OF THE DRAWINGS

FIG. 3 is a flowchart detailing the operation of the server of the contact center of FIGS. 1 and 2;

FIG. 4 is a flowchart detailing the operation of a first agent terminal of the contact center of FIGS. 1 and 2;

DETAILED DESCRIPTION OF PREFERRED EMBODIMENTS

Figure 1:
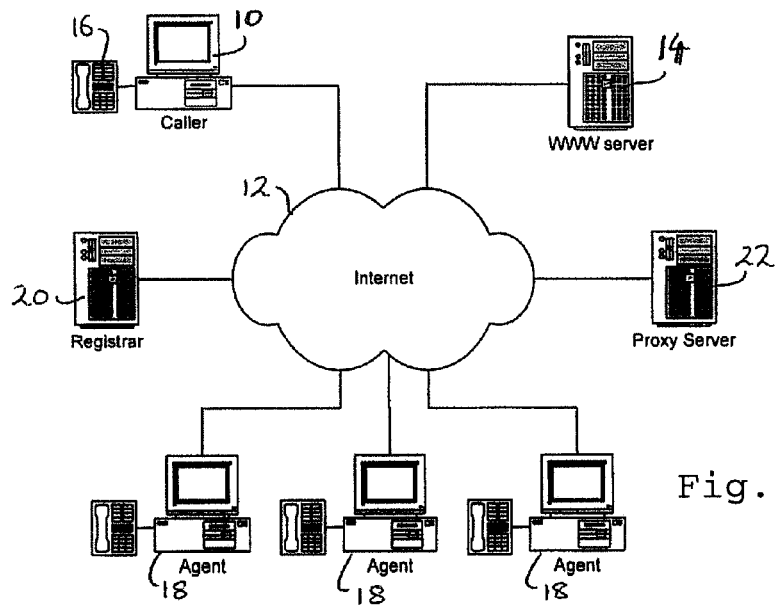
FIG. 1 is a network architecture of a peer to peer contact center system.

In FIG. 1 there is shown a network architecture which can be used to implement the present invention. An individual 10, referred to as the "caller", connects to the Internet 12 or to another network providing similar functionality, and accesses a web server 14. Web server 14 hosts a webpage listing a number of peer to peer contact centers which are available to the caller.

The caller's computer system is provided with an Internet protocol (IP) phone 16, either as a peripheral piece of hardware, or as a "softphone" application running on the computer. The webpage hosted by the web server 14 provides the caller with information allowing the caller to use the phone 16 to contact each listed contact center, or the webpage might instead provide an automated mechanism for doing this.

In one example, the webpage might list telephone numbers to be called, or session initiation protocol (SIP) addresses to be called. More preferably, however, the webpage provides clickable links which, when clicked by the caller, are effective to cause the caller's browser to launch the caller's SIP client and thereby place a call to the specified SIP address (this mechanism is similar to the functionality whereby one can click on an email address on a webpage to launch an email client which automatically opens a message addressed to the address. It is envisaged that the webpage 14 might list a number of available contact addresses relating to a range of topics and issues. Conceivably, the listing of contact addresses can be provided with a similar hierarchy to Usenet groups.

Alternatively, the webpage might limit access to contact addresses of chosen by the author of the webpage. For example, a webpage relating to and intended for enthusiasts of a particular computer game might have buttons labelled "click here to chat about strategy" and "click here to chat about tech problems", and these would launch SIP calls to the respective peer to peer contact centers dealing with those issues.

Alternatively, just as Google Groups provides access to almost all of Usenet, companies such as Google, Microsoft or Yahoo could use their networks to allow subscribers to create any desired peer to peer contact center, with those contact centers being hosted on the company's servers and accessed from web interfaces controlled by the company. In this way, a subscribed user could browse through the list of available peer to peer contact centers, and if it was felt that the required contact center did not already exist, then the subscribed user might opt to create a new contact center dedicated to the topic of interest. Similarly, any subscribed user could nominate himself or herself as an agent in respect of a particular contact center, thereby making that user available to answer calls from other users.

Thus, once a peer to peer contact center has been created, users 18 of the network 12 can register themselves as agents. FIG. 1 is described with reference to only a single contact center with three agents 18 having been registered. Each such agent might simultaneously be involved in the role of a caller to some other contact center accessible via web server 14, and could be an agent in respect of a number of contact centers simultaneously. Each agent 18 is connected to the Internet using a combination of a personal computer (PC) and a telephone, which may again be provided a softphone or as a hardware phone interfacing with the agent's PC. The agent's PC executes a program providing telephony capabilities using the session initiation protocol (SIP) which is described in detail in RFC 3261. The SIP client acts as a SIP "user agent client" and "user agent server", enabling the initiation, transfer and termination of calls in accordance with the SIP protocol.

A registrar server 20 is also connected to the Internet. In the SIP environment, registrar servers maintain a location database with the contact information of SIP user agents. A SIP proxy server 22 is also provided (in practice there will be many such proxy servers). The proxy server is an intermediary entity that acts both as server and client allowing requests to be passed on to other entities in the SIP network, if necessary with reformatting of the request.

In the context of the described embodiment, the proxy server 22 is the destination for the contact center SIP address published on the webpage hosted by web server 14. A piece of software running on the proxy server 22 enables each agent 18 to register as an agent in respect of that specified SIP address, and thus the proxy server 22 maintains a listing of which agents are currently available for that specified SIP address.

As will be described in further detail below, when caller 10 selects the SIP address for the specified contact center services by the agents 18, the caller's own SIP client sends a SIP request to the proxy server 22. Proxy server 22 selects one of the agents registered in respect of that contact center SIP address and transfers the call to that agent, with the choice of agent being made according to predefined rules. The agent's PC which receives the communication session can either cause the call to be answered, or can hold the call, or can transfer it to another agent, as again will be described further below.

Figure 2:
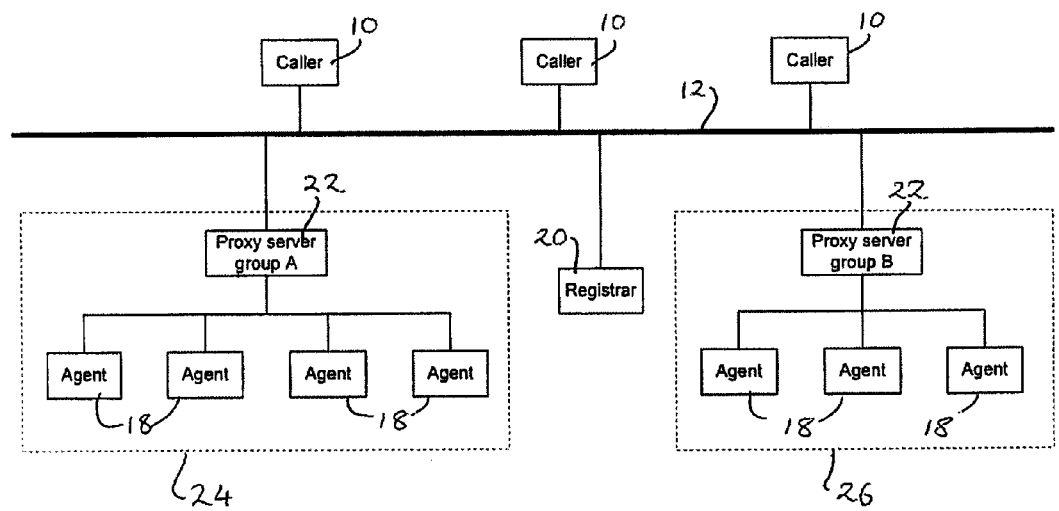
FIG. 2 is an alternative view of the FIG. 1 system showing an operational hierarchy.

Referring additionally to FIG. 2, the environment of FIG. 1 is shown as an organisational diagram to illustrate the operational organisation between the proxy server 22 and the agents 18. Two virtual contact centers 24, 26 are shown. It is envisaged that contact center 24 will exist to facilitate discussion in relation to a first topic, and that contact center 26, which will have its own unique SIP address, will exist in order to discuss matters associated with a second topic. Proxy servers 22 (which may be physically co-located on the same server or may be located on distinct servers) receive SIP invite requests (with the assistance of the registrar server 20) from various callers 10 connected to the Internet 12. Below each proxy server 22 in this hierarchy, are the agents 18 who can each hold a plurality of calls, can each service their own calls with media or recorded announcements, in the manner of a traditional contact center, and which can each answer the call locally (by connecting the held caller 10 to the user of agent terminal 18), or can transfer the respective call to a more suitable agent terminal registered for the same contact center. A single contact center can employ a plurality of proxy servers operating in co-operation with one another, allowing calls to be transferred between agents registered with different proxy servers. Note that the functions of each of the proxy servers detailed above can be fulfilled by a single proxy server.

The invention will now be further illustrated by reference to a process described in the flowchart of FIG. 3. The process of FIG. 3 describes one implementation of how calls might be handled in the environment of FIGS. 1 and 2. While described in relation to a SIP environment, the same principles of call handling and allocation can equally be implemented in other environments using other protocols.

As previously described, a caller 10 selects a webpage option to initiate contact with a peer to peer contact center. In the present case, it is assumed that the user wishes to ask about the Java programming language and therefore selects a webpage option to "speak with a Java expert". If the peer to peer contact center has no live agents (i.e. no users currently registered to act as agent), then this contact center option might be "greyed out" or otherwise inoperative. Assuming that there are active agents, however, after selecting this option in step 30, the SIP client of that caller places a call to the SIP address fed to it by the web server 14 (which is sip:Javaexpert@example.com), step 32. This address is registered at registrar server 20 to proxy server 22 (FIG. 1) and thus the proxy server receives a SIP Invite request, step 34.

The proxy server runs a routing application with very limited functionality. As previously described, this application allows users to register themselves as agents for a given contact center SIP address, maintains a listing of each active agent registered for each SIP address under its control, and transfers calls arriving at those SIP addresses to those registered agents according to pre-specified rules such as least busy agent, agent with fewest held calls, most recently registered agent, random agent, etc.

In addition, the proxy server application creates a record unique to the received call from caller 10. This is an XML file designated "XML-C", step 36. The purpose of XML-C is to record details of the call history and handling for use in the further handling of the call and for use in subsequent reporting and statistics. At each significant event in the life of the call, an appropriate entry is made in the XML-C record, noting the event using appropriate proprietary tags.

After noting the arrival of the call (i.e. the SIP Invite request) in step 36 in the newly-created XML-C record, the proxy server selects one of the registered agent terminals 18, step 38, and forwards the request to that selected agent terminal. This can occur without having to request permission or availability from the agent, since the caller is not connected through to the agent of agent terminal 18 when it reaches that selected agent terminal, it is simply accepted automatically, placed on hold and treated according to pre-defined criteria.

Each agent terminal 18 is running a SIP client which can simultaneously treat very many calls, since the resources required are minimal. When the call is transferred to the selected agent, step 40, the XML-C record is updated by the proxy server 22 to note this transfer, step 42, and then the XML-C record itself is sent to the selected agent terminal, step 44. This terminates the involvement of the proxy server 22 for the time being, and therefore the process now is taken over by the selected agent terminal, as will be described with reference to FIG. 4.

As indicated in FIG. 4, after the call and XML-C record have been transferred to the selected agent terminal, the call is held there, step 46. A contact center application running on the agent PC 18 runs a workflow which is defined in a stored file XML-WF, step 48.

The workflow file describes the various steps in a contact center treatment workflow which should be applied to the call. These can include placing a call on hold, providing media content to the caller, such as music-on-hold or recorded announcements or advertisements, playing short recorded announcements and awaiting responses in the manner of an interactive voice response system, and thereby collecting data on the call, etc. Thus, the agent terminal will typically have media files available to the agent PC application and referenced in the XML-WF workflow. These media files can be played as part of the audio stream to the caller 10, and responses, such as DTMF tones or voice prompts received from the caller, will be fed to the agent PC application to determine the further navigation of the workflow. Alternatively, the workflow can redirect the session to a dedicated media server which is directed by the Agent terminal to execute a specific media application and to forward gathered information together with the call once such information is available.

Accordingly, the caller response to workflow prompts in step 50 and based on the collected responses from the caller, and agent skillset requirement file, XML-AS, is generated, step 52.

In addition to creating the XML-AS record (which is used to search for suitable agents), the record associated with the call itself, XML-C, is updated to note the skillset, either by directly writing to that record the skillset identifiers or by creating a reference within the record to the newly created XML-AS record.

The next step is to determine the availability of an agent who is equipped to handle this call. This is done by broadcasting XML-AS to all agent terminals registered with the proxy server 22, step 56. Each agent PC which receives this XML-AS message matches it against a locally stored agent profile file XML-A. The profile will record the skillset specialities of the user of that agent terminal, either as described by the user himself or herself, or as independently evaluated by a moderator of the peer to peer contact center or by other users. Such reviewing can occur at the termination of a call, whereby the caller rates the ability of the agent to deal with various aspects of the call, and from this set of ratings, a skillset description of the agent can be generated or updated. In less formal environments, agents can simply put themselves forward as being expert in one or more pre-defined areas for that peer to peer contact center.

If no agents are currently available with a suitable skillset match, then no responses will be received back, step 60. In such circumstances, the agent terminal 18 which is holding the call will wait for a further response and will continue to treat the call in accordance with the XML-WF (which should be written to accommodate this possibility). Typically, the XML-AS poll will occur again after a pre-specified period, step 56, and this will continue until the caller either terminates or until an answer is received. It is possible also that the workflow will allow the caller to record a message which will be subsequently available to agents from a stored repository, and in this way, the query can be dealt with offline.

If a response is, however, received back identifying a suitable agent, step 64, or if more than one such response is received, thereby identifying a plurality of available and suitable agents, the call will be transferred to a selected one of such agents, step 66 (the criteria for choosing between a number of available and suitable agents can be as simple or complex as desired). Typically, the longest waiting agent will be selected, or the one who has the highest percentage skillet match.

It is also conceivable that agents might bid to answer the calls if there is perceived to be monetary or other value in doing so, thereby introducing a business element to the workflow. Alternatively or additionally, the caller might set a price which he or she is prepared to pay for a satisfactory response, and the workflow might then select the cheapest agent or the one prepared to most closely match the price set by the caller. Other possibilities will suggest themselves to the skilled person and will depend on the commercial value of the calls and the skills of the agents. After the transfer of the call to the successful agent PC, the XML-C file is updated at the PC of the agent from which the call has been transferred, and then this XML-C file is forwarded on to the successful agent PC where it remains available for recording further events in the history of the call.

Figure 5:
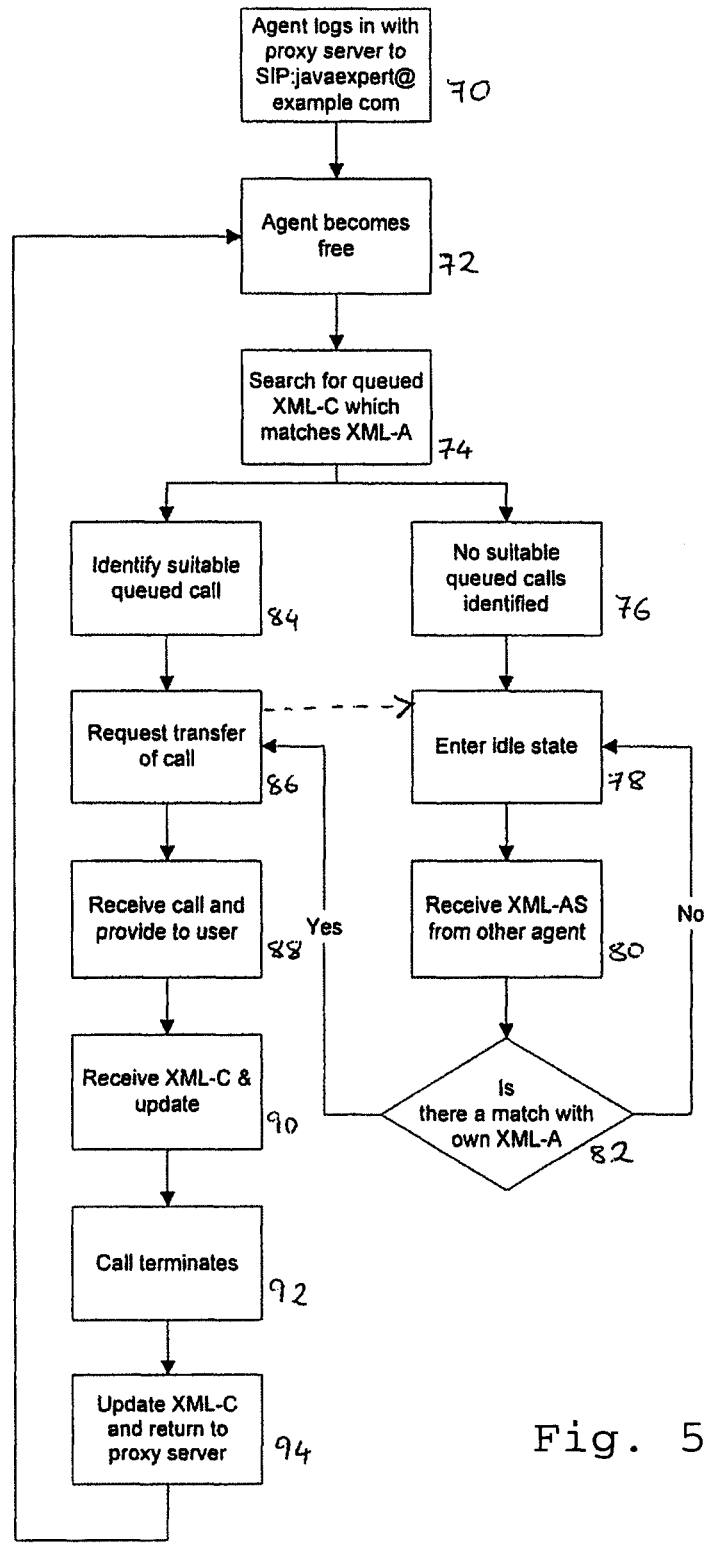
FIG. 5 is a flowchart detailing the operation of a second agent terminal of the contact center of FIGS. 1 and 2.

Referring now to FIG. 5, the process is described from the point of view of an agent who receives a call. This process can be said to begin when the agent logs in with the proxy server 22, selecting the SIP address(es) which he or she wishes to be available in respect of. Thus, in step 70, a particular agent logs in with proxy server 22 to the address sip: javaexpert@example.com. The agent can be expected to be immediately free, step 72, having just logged in. In this condition, the agent PC application running on the agent's PC searches for queued calls by requesting from other agents a match between their stored XML-C files (i.e. their held calls) and the agent's own XML-A file. A match can also be requested between stored XML-AS files on other agent PCs which can be matched against the XML-A file of the agent looking for calls.

If no suitable queued calls are identified, step 76, then the agent PC application enters an idle state, step 78 until it next receives an XML-AS file from another agent PC, step 80, in accordance with the procedure described in steps 56 and 58 of FIG. 4. Thus, the agent PC in question, upon receiving an XML-AS file, checks for a match against its own XML-A, step 82. If no match is found, then the process reverts to step 78.

If, however, on searching for a queued call a suitable queued call is identified, step 84, or if in step 82 it is determined that there is a match between a received XML-AS file and the agent's XML-A, then the agent PC application requests transfer of the associated call, step 86. In the event that the call is not transferred (perhaps because some other agent PC has been selected in preference), then the process enters the idle state of step 78.

If, however, the request of step 86 results in the transfer of a call, that call when received is provided to the user of the described agent PC, step 88, thereby placing the two parties in contact. Immediately after receiving the call, the associated XML-C file will be received and can be updated to note the receipt and connection of the agent (or any other error conditions which might occur), step 90. When the call terminates, step 92, the XML-C file is updated, step 94 and returned to the proxy server for reporting and further logging purposes. This results in the agent becoming free again at step 72.

It will be appreciated that other outcomes are possible, such as that the agent 18 logs off or is disconnected, or that after answering the caller, the user behind agent PC 18 decides that he or she is not competent to answer the call, in which case options can be provided to transfer to another agent, to update the XML-AS file and redistribute it to all other agents.

The invention is not limited to the embodiment(s) described herein but can be amended or modified without departing from the scope of the present invention.

We claim:

1. A method of operating a contact center comprising the steps of:
    registering a plurality of agent terminals with a server;
    said server directing a communications session to a first one of said agent terminals;
    said first agent terminal holding said communications session and subjecting said session to automated treatment;
    said first agent terminal broadcasting a record associated with said automated treatment to a plurality of second agent terminals registered with said server;
    said first agent terminal receiving a response from one or more of said second agent terminals indicating availabilty for live participation in said communications session;
    said first agent terminal selecting one of said second agent terminals that responded to said first agent terminal; and
    said first agent terminal directing said communications session to the selected second agent terminal.

2. A method as claimed in claim 1, wherein said server directs the session to said first agent terminal without subjecting said session to media treatment or skillset analysis.

3. A method as claimed in claim 1, wherein said communications session is created using the session initiation protocol (SIP) and wherein the step of directing said communications session to the first agent terminal is carried out by the server receiving and forwarding a SIP request message to said first agent terminal, whereby said first agent terminal can complete the set up of a call in response to said request message.

4. A method as claimed in claim 3, wherein said server is a proxy server registered to a SIP address which provides a portal to the contact center.

5. A method as claimed in claim 4, further comprising the steps of:
    the first agent terminal forwarding to the second agent terminal a record associated with the communications session recording the arrival and treatment of the session; and
    said second agent terminal updating said record with further details of the communications session at said second agent terminal.

6. A method as claimed in claim 1, wherein said step of said first agent terminal subjecting said session to automated treatment comprises said first agent terminal determining a skillset requirement of the communications session.

7. A method as claimed in claim 6, wherein the step of selecting said second agent terminal for live participation in said session comprises comparing said communications session skillset requirement with information held at each of said second agent terminals regarding the users of those terminals.

8. A method as claimed in claim 7, wherein said comparison between said communications session skillset requirement and user information is conducted by each of said second agent terminals on receipt of said skillset requirement.

9. A method as claimed in claim 7, wherein said comparison between said communications session skillset requirement and user information is conducted by said first terminal on receipt of said user information from the respective second agent terminals.

10. A method as claimed in claim 7, wherein the user information includes information about the skills and preferences of the users.

11. A method as claimed in claim 7, wherein the user information includes information indicative of the state of availability of the user to participate in the communications session.

12. A method as claimed in claim 7, wherein at least one of the skillset requirement and the user information are communicated in files swapped between the first agent terminal and one or more of said second agent terminals.

13. A method as claimed in claim 12, wherein said files are created and maintained by the respective terminals in the extensible mark-up language (XML).

14. A method as claimed in claim 7, wherein at least one of the skillset requirement and the user information are communicated in messages between the first agent terminal and one or more of said second agent terminals.

15. A method as claimed in claim 14, wherein said messages are session initiation protocol (SIP) messages.

16. A computer program product comprising a non-transitory computer readable medium encoded with computer executable instructions, which when executed in a computer system for use as an agent terminal of a contact center is effective to cause said computer system, after registering as an agent terminal with a server and receiving from said server a communications session, to:
    hold said communications session and subject said session to automated treatment;
    broadcast a record associated with said automated treatment to a plurality of second agent terminals;
    receive a response from one or more of said second agent terminals indicating availabilty for live participation in said communications session;
    select one of the second agent terminals, similarly registered with said server as an agent terminal, for live participation in said communications session; and
    direct said communications session to the selected second agent terminal.

17. A contact center system comprising:
a server;
a plurality of agent terminals registered with said server;
said server comprising a direction program for directing a communications session to a first one of said agent terminals;
said first agent terminal being programmed to hold said communications session and subject said session to automated treatment;
said first agent terminal being programmed to broadcast a record associated with said automated treatment to a plurality of second agent terminals registered with said server;
said first agent terminal being programmed to receive a response from one or more of said second agent terminals indicating availabilty for live participation in said communications session;
said first agent terminal being further programmed to select one of said second agent terminals that responded to said first agent terminal; and
said first agent terminal being further programmed to direct said communications session to the selected second agent terminal.

18. A method of operating a contact center comprising the steps of:
registering a plurality of agent terminals with a proxy server registered to a session initiation protocol (SIP) address which provides a portal to the contact center;
said server directing a communications session created using SIP to a first one of said agent terminals, by the server receiving and forwarding a SIP request message to said first agent terminal, whereby said first agent terminal can complete the set up of a call in response to said request message;
said first agent terminal holding said communications session and subjecting said session to automated treatment;
said first agent terminal broadcasting a record associated with said automated treatment to a plurality of second agent terminals registered with said server, the record recording the arrival and treatment of the session;
said first agent terminal receiving a response from one or more of said second agent terminals indicating availabilty for live participation in said communications session;
said first agent terminal selecting one of said second agent terminals that responded to said first agent terminal;
said first agent terminal directing said communications session to the selected second agent terminal; and
said selected second agent terminal updating said record with further details of the communications session at said selected second agent terminal.

19. A method of operating a contact center comprising the steps of:
registering a plurality of agent terminals with a server;
said server directing a communications session to a first one of said agent terminals;
said first agent terminal holding said communications session and subjecting said session to automated treatment including determining a skillset requirement of the communications session;
said first agent terminal broadcasting a record associated with said automated treatment to a plurality of second agent terminals registered with said server;
said first agent terminal receiving a response from one or more of said second agent terminals that are available for live participation in said communications session;
said first agent terminal selecting a one of said second agent terminals that responded to said first agent terminal for live participation in said communications session, wherein the step of selecting said second agent terminal for live participation in said session comprises comparing said communications session skillset requirement with information held at each of said second agent terminals regarding the users of those terminals; and
said first agent terminal directing said communications session to the selected second agent terminal.

* * * * *